May 15, 1934.	R. HOPE	1,958,514
BAIT AND LURE RETRIEVER
Filed April 20, 1932

INVENTOR.
ROBERT HOPE.
BY
ATTORNEYS.

Patented May 15, 1934

1,958,514

UNITED STATES PATENT OFFICE 1,958,514

BAIT AND LURE RETRIEVER

Robert Hope, Detroit, Mich., assignor of one-half to Walter L. Gaskell, Ypsilanti, Mich.

Application April 20, 1932, Serial No. 606,307

1 Claim. (Cl. 43—30)

This invention relates to a bait and lure retriever.

Considerable difficulty is usually experienced in fishing, particularly with lures in that the hooks on the lures quite often are caught on logs or other objects and due to the flexible line it is practically impossible to release the hooks. As a result the line is usually broken and the lure is lost.

I have conceived the idea of retrieving these lures without disconnecting the lure from the fishing rod by the application of a weighted member adapted to be placed on the line, between the rod and the lure, and slid up and down on the line into engagement with the lure.

An important object of this invention is to provide a weighted device which will strike the lure and force the hook in the opposite direction from which it was engaged.

Another object of the invention is to provide a device which is readily applied to the line and one which may be conveniently carried in a fishing kit.

Other objects and advantages will more fully appear from the following description taken in connection with the accompanying drawing, in which.

Figure 1:
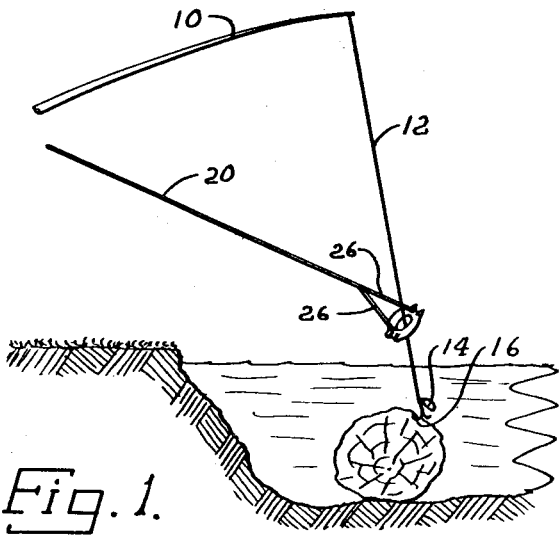
Fig. 1 is a diagrammatic view illustrating a fishing rod, line and lure in a hooked position on an object, shown as a log.
Figure 5:
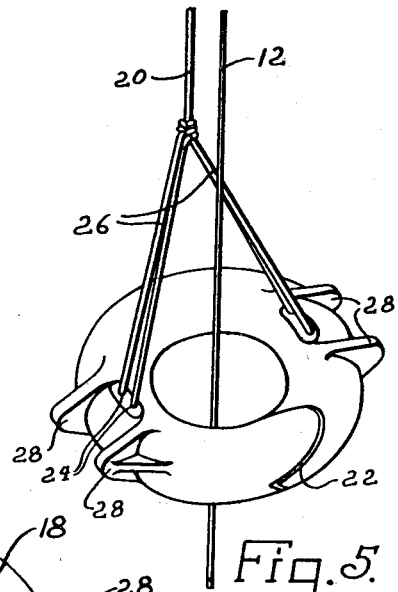
Fig. 5 is a perspective view showing a holding means on the device.

Referring to the drawing, the reference numeral 10 indicates a fishing rod to which is secured a line 12 having at the end thereof a lure 14, the latter being provided with a plurality of hooks 16. The retriever 18 is shown on the line 12 and is provided with a line 20 which permits the retriever 18 to slide, under the control of the fisherman, on the line 12.

Figure 2:
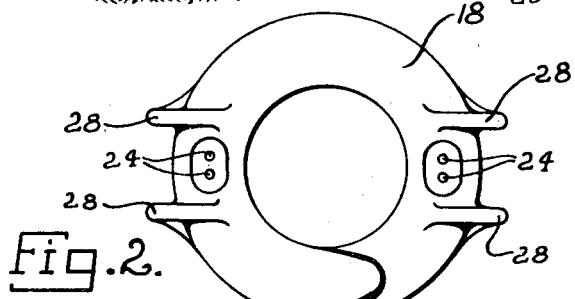
Fig. 2 is a plan view of the retriever.
Figure 3:
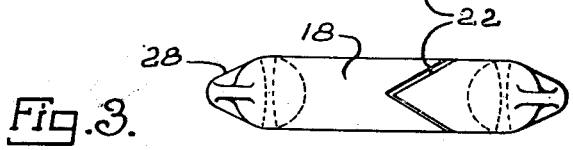
Fig. 3 is a side elevation of Fig. 2.
Figure 4:
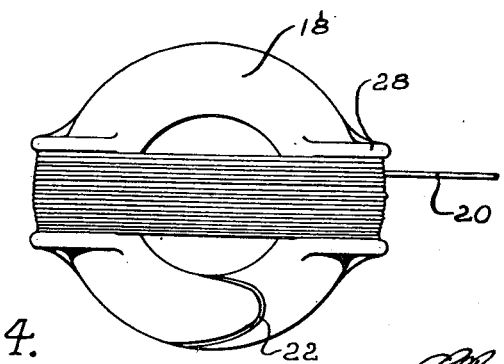
Fig. 4 is a plan view of the device showing a holding means, such as a string, wrapped around the device.

Referring to Fig. 2, the retriever consists of a ring like member having a central opening through which the line 12 extends. A V-shaped passage is formed in one side of the ring like member for the reception of the line when it is desired to place the retriever on the line 12. It will be noted that this passage is formed in V-shape so that when it is desired to place the ring on the line 12, the line must be threaded through the V-shaped passage and after it is in position on the line it is practically impossible for the line to assume a position corresponding to the V-shaped passage, thereby making it practically impossible for the line to pass through the passage without the aid of the fisherman. The V-shaped passage consists of two connected passages extending diagonally to the axis of the central opening.

As a means for securing the ring like member 18 to the line 20, I have provided in opposite sides of the retriever 18 two adjacent apertures 24 which receive lines 26, the free ends of which are secured to the end of the line 20.

On each of the opposite sides of the retriever 18 I have provided a pair of outwardly extending ribs 28 which form guides for the line 20, which guides permit the latter to be wound around the retriever 18, thereby eliminating the use of any additional means for receiving the line 20 when the retriever is not in use.

The retriever is preferably made of lead to insure sufficient weight in a small, compact member for accomplishing the desired result. It will be understood that when a hook of the retriever has become fastened to an object the weight may be readily applied to the line, and by controlling the retriever with the line 20, it may be raised a short distance above the lure and suddenly dropped upon it, forcing it in the opposite direction to which the hook was engaged, thereby releasing it.

It will be understood that various changes, including the size, shape and arrangement of parts, may be made without departing from the spirit of my invention, and it is not my intention to limit its scope other than by the terms of the appended claim.

I claim:

A lure retriever having an annular body portion provided with an annular central opening, a tortuous passage severing the body for the insertion of a line from the outer periphery of the body to the central opening, a plurality of openings in the body for the reception of a line, and outwardly extending flanges on said body.

ROBERT HOPE.